Patented Jan. 5, 1926.

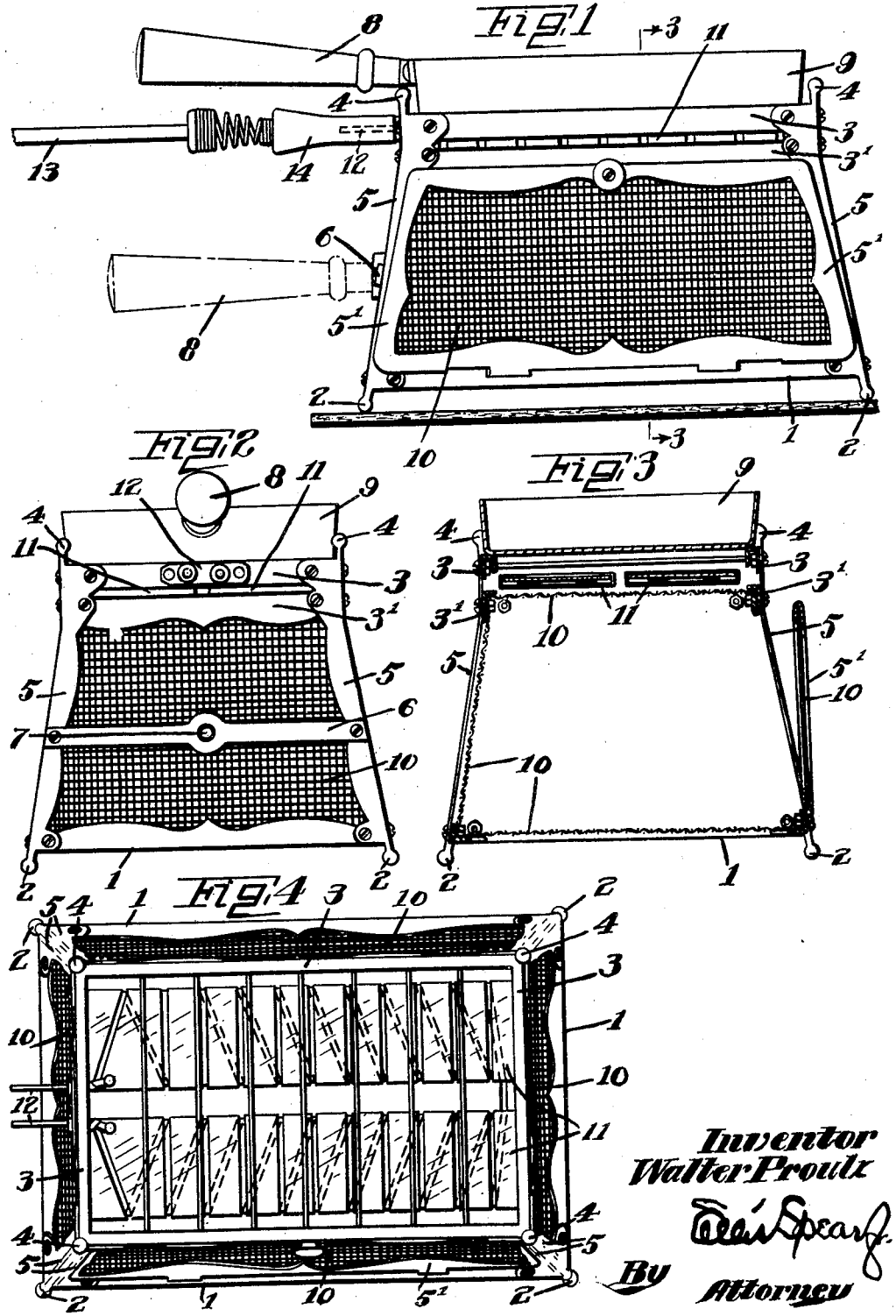

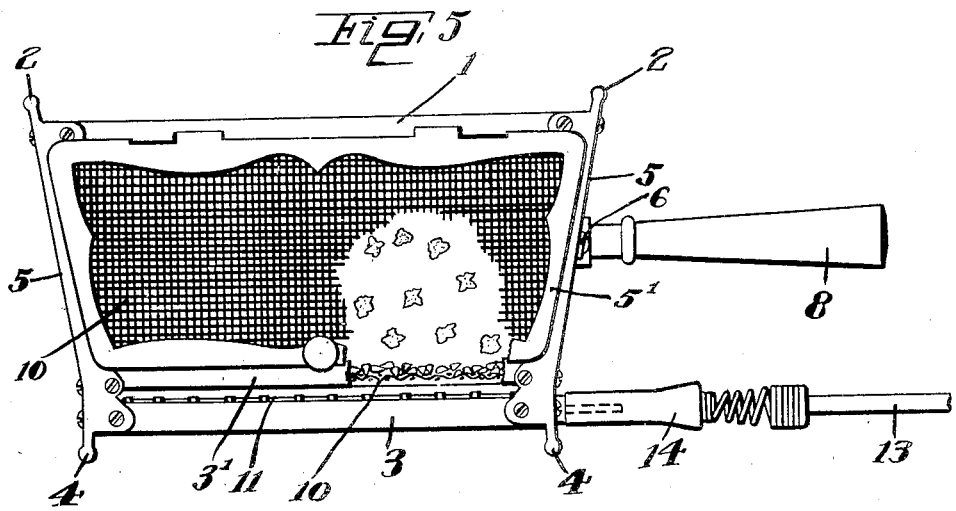
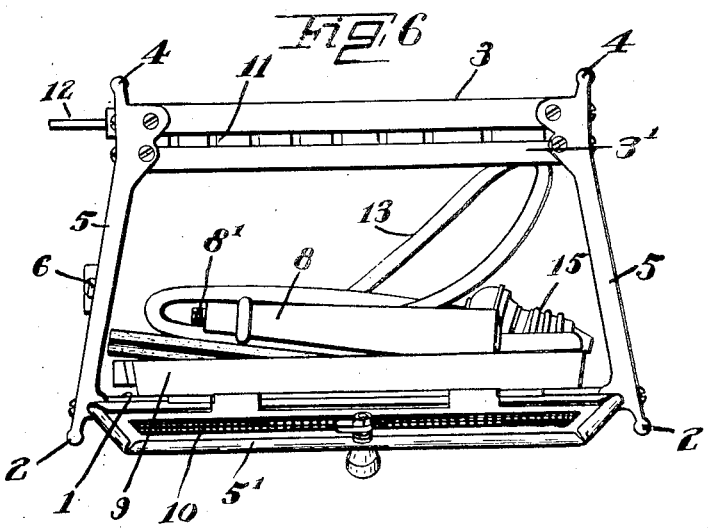

1,568,767

UNITED STATES PATENT OFFICE.

WALTER PROULX, OF NORRIDGEWOCK, MAINE.

ELECTRICAL APPLIANCE.

Application filed May 7, 1924. Serial No. 711,599.

*To all whom it may concern:*

Be it known that I, WALTER PROULX, a citizen of the United States, residing at Norridgewock, county of Somerset, State of Maine, have invented certain new and useful Improvements in Electrical Appliances, of which the following is a specification.

This invention relates to cooking appliances. More particularly it has to do with combined domestic apparatus in which service of general character is combined with specific adaptability for certain uses.

In the particular embodiment which I have selected as illustrative of my present invention I provide what is in effect a general utility electric stove of the table type and adapted for all general light cooking such as toasting, broiling, frying and boiling. With this I combine a novelty feature by which the device becomes a portable popper for the making of pop corn and the like. The embodiment combines a variety of features of advantage which I will discuss in the following specification. The embodiment is illustrated in the accompanying drawings to which reference is made throughout the specification by use of characters of reference.

Fig. 1 is a side elevation of my appliance in use as a table stove.

Fig. 2 is an end view thereof.

Fig. 3 is a central transverse section.

Fig. 4 is a plan view.

Fig. 5 is a side elevation partly broken away showing use as a corn popper, and

Fig. 6 is a frame view indicating pack feature of outfit.

In the embodiment shown I have provided a frame which may be described generally as a polyhedron and more specifically as a truncated pyramidal figure. It is in fact simply the frame shape of the conventional corn popper basket so familiar to all.

Such comprises rectangular base members 1 supported on feet 2. Parallel to these are members 3 having similar corner projections or feet 4. These lateral frame members 1 and 3 are spaced by angled corner pieces 5 which terminate in the members 2 and 4 making of the frame a skeleton truncated quadrilateral pyramid. At one end the frame is cross braced as at 6 with a central boss apertured and tapped as at 7 to receive the threaded end $8^1$ of a detachable handle 8.

The handle 8, which is of such length that it may be contained within the frame work 1—3—5, is interchangeably related to the pan 9. This pan is also of truncated or flaring rectilinear form. Its base fits within the space defined by the frames 3 and is retained by the feet 4 so as to be safely lodged. When in cooking position as shown in Figs. 1, 2 and 3, upon the rectangular frame formed by the form members 3. This frame is in fact a double frame. The members 3 are paralleled at a short distance by the members $3^1$. The members $3^1$ with the frame pieces 1 and 5 support screen panels 10 which enclose the faces of the polyhedron. On one of the faces, preferably one of the inclined side faces, I provide a door frame as at $5^1$ also fitted with a screen panel 10. This gives access to the interior of the base or cage for the storage of the parts as indicated in Fig. 6, or for use as a warming storage for toast or the like as shown in Figs. 1 to 3, or for access when the device is used as a popper as shown in Fig. 5.

Between the frames 3 and $3^1$ I mount an electric heating unit 11. This may be variously formed but is in general a wound resistance suitably connected to a plug 12.

A flexible electric conductor 13 is provided having at one end a plug 14 adapted to fit the plug 12 and at the other end a connection 15 for lamp socket or base plug as may be desired.

From the above it will be seen that I have provided for a device of varied service. As a general service cooker as shown in Figs. 1 to 3 it is economically justifiable as utilitarian equipment. All of the usual dishes may be cooked as by toasting, frying, broiling or boiling.

On the other hand the device may be inverted into social or confection making use by mere shifting of the handle 8 to its position in the frame boss 6. So fitted the device—or its frame body proper—is a convenient hand corn popper. Its efficiency is high and it may be noted that electrically popped corn is far superior to any produced by the heat of general combustion with its entailed gases.

Various modifications in structure as to form or details may be resorted to. All such are to be considered as within the contemplation of my invention as defined below.

What I therefore claim and desire to secure by Letters Patent is:

1. A corn popper comprising a cage, an electric heater in the bottom thereof, a pan dimensioned to fit within said cage and fitting said heater bottom, and a detachable handle adapted to connect with said pan or said cage.

2. In an electric appliance of the class described, a polyhedral frame work and having a pair of parallel faces, an electric heater disposed in one of said faces, supporting means on the opposite parallel face, and constituting a base therefor, a pan detachably fitting said first named face, a detachable handle attachable to said frame and said pan.

3. In an electric appliance of the class described, a frame of truncated pyramidal formation, a reticulated sheathing for said frame, an electric heater in the truncated face of the frame, a pan fitting within said frame, and disposable thereon, and a handle detachably interchangeable with said frame or said pan.

4. An electric corn popper comprising a popping cage, an electric heater unit in one face thereof, and means for supporting the cage on the opposite face to the heater unit with the heater unit above the base and a pan dimensioned to fit on said heater face and flared to conform to said cage and a detachable handle adapted to be fitted to said cage or said pan.

5. In an appliance of the class described, a polyhedral frame, a screen covering for said frame and constituting an enclosed base, a heating unit disposed in one face of the frame, a pan shaped to fit said face and dimensioned to fit within said base, and a detachable handle attachable to said frame and base.

6. A device of the class described, comprising a wire mesh receptacle having a frame, certain of the edge members of which are extended to form supporting members, and a heating unit mounted on the frame and parallel to one face of the receptacle and spaced therefrom.

7. A device of the class described, comprising a wire mesh receptacle, a frame therefor, and an uncovered resistance heating unit mounted in said frame and parallel to one face of the receptacle and freely spaced therefrom in heat diffusing relation thereto.

8. A device of the class described, comprising a wire mesh receptacle having a frame, certain of the edge members of which are extended to form supporting members, and a heating unit mounted on the frame and parallel to one face of the receptacle and spaced therefrom, and a cooking utensil disposable over said heating unit and fitting within the supporting members of said frame adjacent said heating unit.

In testimony whereof I affix my signature.

WALTER PROULX.